(12) United States Patent
Chuah

(10) Patent No.: US 7,346,023 B2
(45) Date of Patent: Mar. 18, 2008

(54) RECONFIGURABLE WIRELESS COMMUNICATION ACCESS SYSTEM AND METHOD

(75) Inventor: Mooi Choo Chuah, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1109 days.

(21) Appl. No.: 09/935,023

(22) Filed: Aug. 22, 2001

(65) Prior Publication Data

US 2003/0076803 A1 Apr. 24, 2003

(51) Int. Cl.
*H04Q 7/00* (2006.01)

(52) U.S. Cl. ............... 370/328; 370/401; 455/453; 455/560

(58) Field of Classification Search ........ 370/328, 370/338, 349, 400, 401
See application file for complete search history.

(56) References Cited

U.S. PATENT DOCUMENTS

| | | | | |
|---|---|---|---|---|
| 5,991,628 | A * | 11/1999 | Pedziwiatr et al. | 455/443 |
| 6,148,201 | A * | 11/2000 | Ernam et al. | 455/433 |
| 6,434,396 | B1 * | 8/2002 | Rune | 455/502 |
| 6,490,259 | B1 * | 12/2002 | Agrawal et al. | 370/331 |
| 6,580,699 | B1 * | 6/2003 | Manning et al. | 370/331 |
| 6,668,170 | B2 * | 12/2003 | Costa et al. | 455/439 |
| 6,701,149 | B1 * | 3/2004 | Sen et al. | 455/436 |
| 6,724,813 | B1 * | 4/2004 | Jamal et al. | 375/219 |
| 6,738,625 | B1 * | 5/2004 | Oom et al. | 455/453 |
| 6,788,657 | B1 * | 9/2004 | Freiberg et al. | 370/328 |
| 6,853,627 | B1 * | 2/2005 | Evans | 370/312 |
| 7,006,450 | B2 * | 2/2006 | Kuster et al. | 370/252 |
| 2001/0046240 | A1 * | 11/2001 | Longoni et al. | 370/503 |
| 2001/0046839 | A1 * | 11/2001 | Latva-Aho et al. | 455/3.05 |
| 2002/0015392 | A1 * | 2/2002 | Musikka et al. | 370/331 |
| 2002/0075824 | A1 * | 6/2002 | Willekes et al. | 370/329 |
| 2002/0168984 | A1 * | 11/2002 | Wallentin | 455/452 |

OTHER PUBLICATIONS

Bos, L. et al., "Toward and All-IP-Based UMTS System Architecture", *IEEE Network*, Jan./Feb. 2001, pp. 36-45.
Koodli, R. et al., "Supporting Packet-Data QoS in Next-Generation Cellular Networks", *IEEE Communications Magazine*, Feb. 2001, pp. 180-188.

* cited by examiner

*Primary Examiner*—Bob A. Phunkulh

(57) ABSTRACT

A reconfigurable radio access network architecture may connect a base station with different base station controllers. By enabling direct connections between the base station and a plurality of base station controllers, a serving base station controller may directly connected to base stations in soft handoff with a wireless unit, thereby reducing the differential delays between signals received by the base stations. The reconfigurable access system reduces the need for having additional base station controllers beyond the serving base station controller involved in communications with a wireless unit.

14 Claims, 6 Drawing Sheets

RECONFIGURABLE WIRELESS COMMUNICATION ACCESS SYSTEM AND METHOD

BACKGROUND OF THE INVENTION

1. Field of the Invention

This invention relates to communications and, more particularly, to a wireless communications access system and method.

2. Description of Related Art

Wireless communications systems include conventional cellular communication systems which comprise a number of cell sites or base stations, geographically distributed to support transmission and receipt of communication signals to and from wireless units which may actually be stationary or fixed. Each cell site handles voice communications over a particular region called a cell, and the overall coverage area for the cellular communication system is defined by the union of cells for all of the cell sites, where the coverage areas for nearby cell sites overlap to some degree to ensure (if possible) contiguous communications coverage within the outer boundaries of the system's coverage area.

When active, a wireless unit receives signals from at least one base station or cell site over a forward link or downlink and transmits signals to (at least) one cell site or base station over a reverse link or uplink. There are many different schemes for defining wireless links or channels for a cellular communication system, including TDMA (time-division multiple access), FDMA (frequency-division multiple access), and CDMA (code-division multiple access) schemes. In CDMA communications, different wireless channels are distinguished by different codes or sequences that are used to encode different information streams, which may then be modulated at one or more different carrier frequencies for simultaneous transmission. A receiver can recover a particular stream from a received signal using the appropriate code or sequence to decode the received signal.

Due to the delay-intolerant nature of voice communication, wireless units in conventional cellular systems transmit and receive over dedicated links between a wireless unit and a base station. Generally, each active wireless unit requires the assignment of a dedicated link on the forward link and a dedicated link on the reverse link. Current wireless communications systems are evolving which provide access to packet data networks, such as the Internet, and support a variety of data services. For example, support for multimedia applications (voice, video and data) is important for any network connected to the Internet. These applications have specific requirements in terms of delay and bandwidth. Traditional data applications are typically bursty and, unlike voice communications, relatively delay tolerant. As such, using dedicated links to transmit data is an inefficient use of network resources. Consequently, resource allocation systems have been devised to make more efficient use of network resources using different quality of service (QoS) classes for the different types of traffic based on the delay-tolerant nature of the traffic.

The Universal Mobile Telecommunications System (UMTS) was designed to offer more wireless link bandwidth and QoS features. FIG. 1 shows a typical UMTS network 10 which can be divided into a radio access network (RAN) 12 and a core network (CN) 14. The RAN 12 comprises the equipment used to support wireless interfaces 16a-b between a wireless unit 18a-b and the UMTS network 10. The RAN 12 includes Nodebs or base stations 20a-c, and radio network or base station controllers (RNC) 22a-b. The core network 14 comprises the network elements that support circuit based communications as well as packet-based communications. In establishing a circuit channel to handle circuit-based communications between the wireless unit 18b and a public switched telephone network (PSTN) 24 or another wireless unit, the base station 20b receives (in the uplink) and transmits (in the downlink), the coded information (circuit voice or circuit switched data) over the wireless interface or link 16b. The RNC 22b is responsible for frame selection, encryption and handling of access network mobility. The RNC 22b forwards the circuit voice and circuit switched data over a network, such as an asynchronous transfer mode (ATM)/Internet Protocol (IP) network to a 3G mobile switching center (MSC) 30. The 3G-MSC 30 is responsible for call processing and macromobility on the MSC level. The 3G-MSC 30 establishes the connectivity between the wireless unit 18b and the PSTN 24.

In establishing a packet channel to handle packet-based communications between the wireless unit 18a and a packet data network (PDN) 34, such as the Internet, the base station 20a receives (in the uplink) and transmits (in the downlink), the coded information over the wireless interface or link 16a. In the uplink direction, the RNC 22a reassembles the packets as sent by the wireless unit 18 and forwards them to SGSN 40. In the downlink direction, the RNC 22a receives the packets and segments them into the right size packet to be transferred across the wireless link 16a. The SGSN 40 provides packet data session processing and macromobility support in the UMTS network 10. The SGSN 40 establishes connectivity between the wireless unit 18a and the PDN 34. A GGSN 42 is the gateway to external PDNs. The GGSN 42 acts upon requests from the SGSN 40 for packet data protocol (PDP) session establishment.

As shown in FIG. 2 for the existing network architecture, wireless unit 50 may establish a wireless link with Nodeb1 or base station 52, which is configured to communicate with RNC 54 (RNC1). As such, RNC 54 becomes the serving RNC (SNRC). The wireless unit 50 moves into soft handoff with Nodeb2 or base station 56. Soft handoff refers to the wireless unit simultaneously communicating with more than one base station. As a result, a leg or connection is added between the base station 56 (Nodeb2) and the RNC 54 (RNC1) since the base station 56 is also configured to communicate with the RNC 54 (RNC1). As the wireless unit 50 moves closer to Nodeb3 or base station 58, the wireless unit 50 moves into soft handoff with the base station 58 (Nodeb3), and a leg or connection is added between the base station 58 (Nodeb3) and the RNC 60. Since the base station 58 (Nodeb3) is configured to communicate with RNC 60 only, the uplink traffic will have to move from the base station 58 (Nodeb3) to RNC 54 (RNC1) via RNC 60 (RNC2). The RNC 60 (RNC2) is referred to as the drift RNC (DRNC). The interface between the a base station and an RNC is referred to as the Iub interface, and the interface between two RNCs is referred to as the Iur interface although UMTS Release 99 does not require Iur to support routing. Currently, both the Iub and Iur interfaces are based on ATM, and ATM switches are allowed between Nodebs and RNCs in UMTS Release 99 architecture.

Several drawbacks exist with the current network architecture. First, the SRNC/DRNC concept can result in large differential delays between the legs or connections with the base stations. For example, the delay from the base station 58 (Nodeb3) to the SRNC or RNC 54 is large because of the extra hop between the SRNC 54 and the DRNC 60. To obtain the benefits of soft handoff, packets from the SRNC must reach the three base stations 52 (Nodeb1), 56 (Nodeb2)

and 58 (Nodeb3) within a certain time window so that the base stations 52, 56 and 58 can send the packets to the wireless unit 50, and the wireless unit 50 can combine the signals from the three legs. The extra delay could cause the signals over the leg of the base station 58 (Nodeb3) to not provide any soft handoff benefit. Second, when the wireless unit 50 moves sufficiently far from the base stations 52 (Nodeb1) and 56 (Nodeb2) such that the wireless unit 50 no longer communicates with them, a complicated SRNC relocation procedure is used to make the DRNC the new SRNC. Third, if the RNC 54 (RNC1) is congested while the RNC 60 (RNC2) is not, new calls arriving on the base station 52 (Nodeb1) or 56 (Nodeb2) have to be rejected since the base stations 52 or 56 cannot communicate directly to the RNC 60 (RNC2). Finally, when an RNC is down all base stations or Nodebs configured to communicate with the RNC will not be functional.

SUMMARY OF THE INVENTION

The present invention is a reconfigurable radio access network architecture where a base station can connect with different base station controllers. For example, a connection network can enable direct connection between the base station and a plurality of base station controllers. By enabling direct connections between the base station and a plurality of base station controllers, a serving base station controller can be directly connected to base stations in soft handoff with a wireless unit, thereby reducing the differential delays between signals received by the base stations. The reconfigurable access system reduces the need for having additional base station controllers beyond the serving base station controller involved in communications with a wireless unit. As such, the complexity of complicated serving base station controller relocation procedures is reduced since serving base stations can communicate directly with the serving base station controller as the wireless unit is serviced by different base stations. Furthermore, the reconfigurable radio access system can provide improved performance and reliability. For example, if a base station controller is loaded at a certain level or down, base stations can connect with a different base station controller. The radio access system can use information on the base station controller(s), the base station(s) and/or the wireless unit for which a connection is being established to determine which base station controller to use in connecting with the base station. For example, a base station controller assignment system can use an operating parameter(s) and/or measurement(s), such as a traffic load or resource availability parameter(s) in determining which base station controller to assign. Thus, the access network can provide improved load balancing and/or system performance.

BRIEF DESCRIPTION OF THE DRAWINGS

Other aspects and advantages of the present invention may become apparent upon reading the following detailed description and upon reference to the drawings in which.

DETAILED DESCRIPTION

Figure 1:
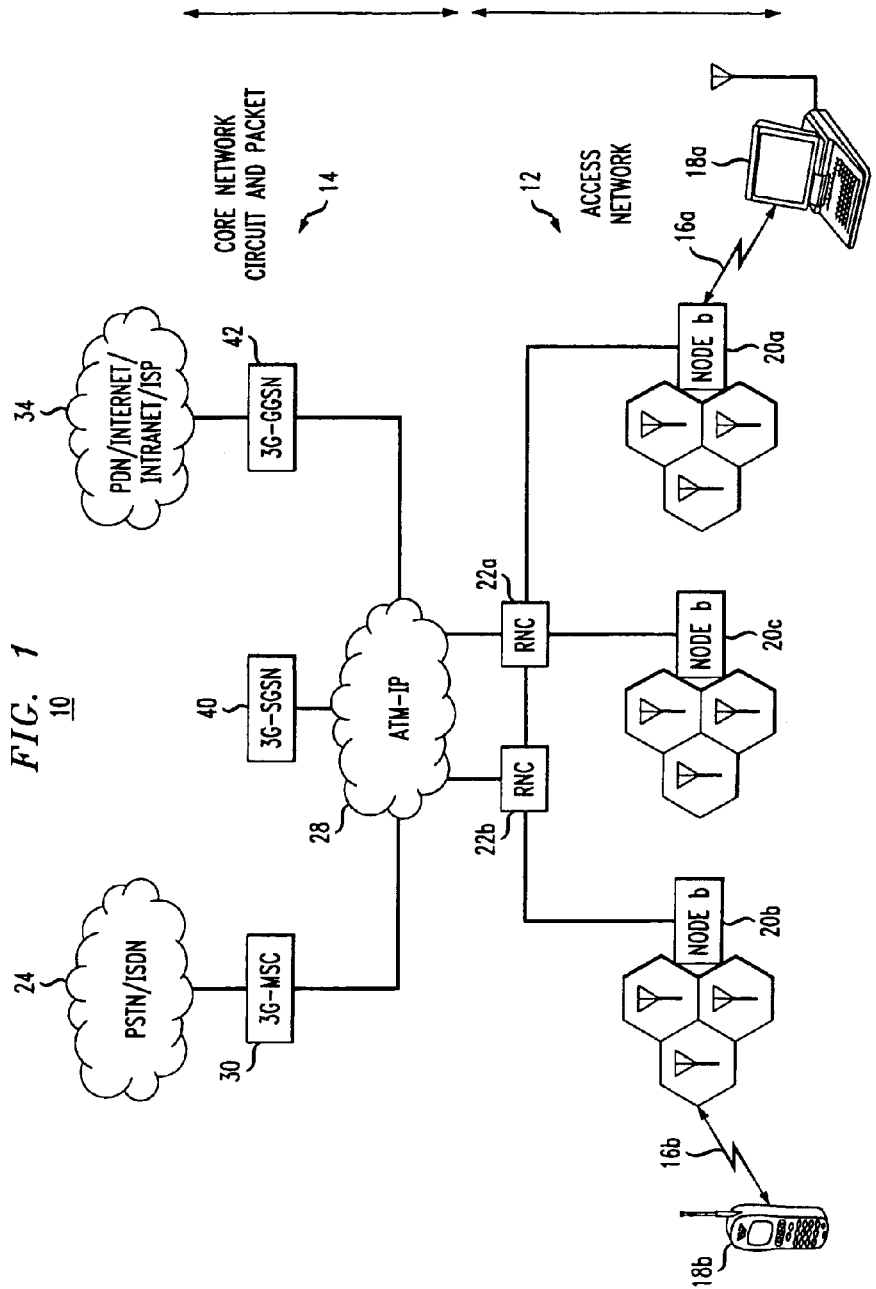
FIG. 1 shows a general block diagram of a UMTS network architecture according to the prior art.
Figure 2:
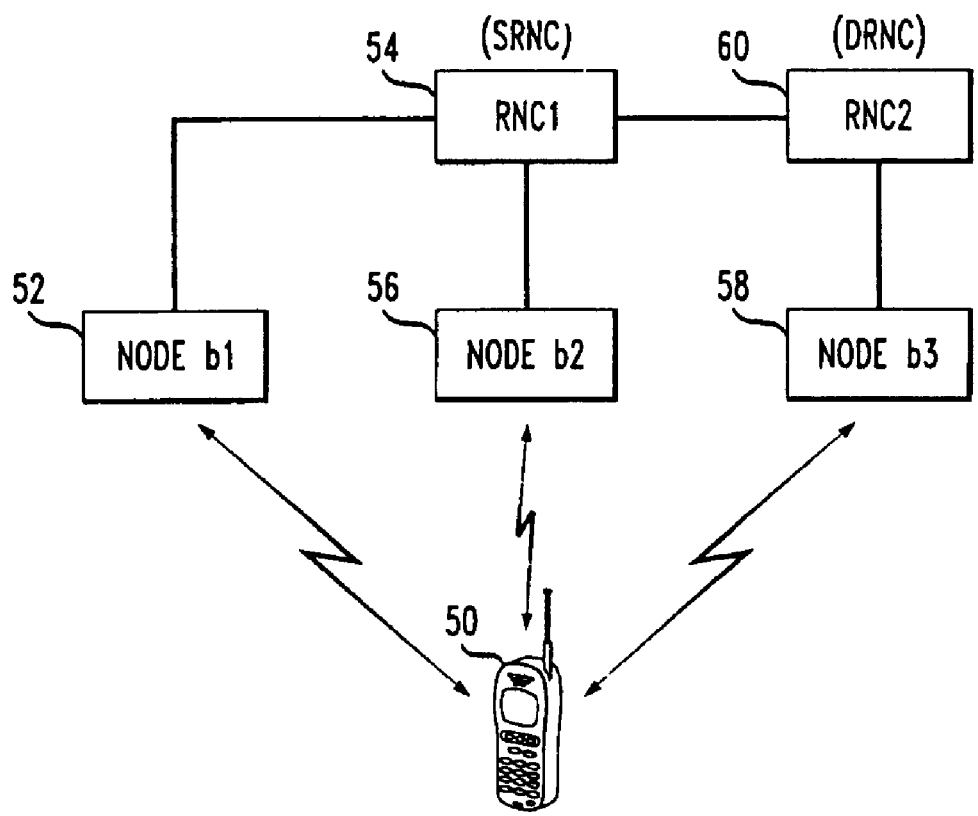
FIG. 2 shows a radio access network architecture for a UMTS network according to the prior art where a wireless unit is in soft handoff.
Figure 3:
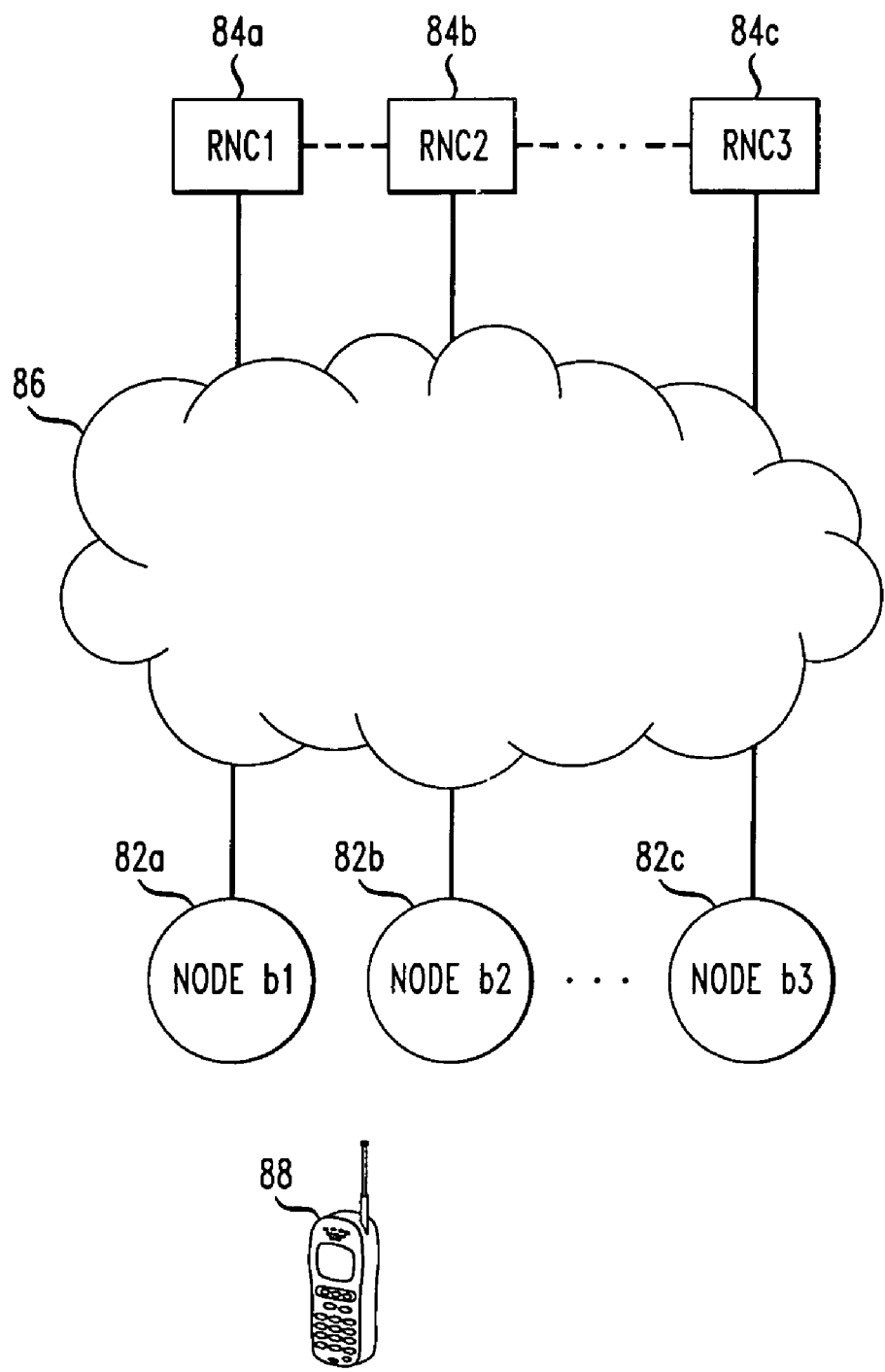
FIG. 3 shows a reconfigurable radio access system according to principles of the present invention.

Illustrative embodiments of the reconfigurable radio access network are described with respect to a radio access network system where a base station can directly connect with different radio base station controllers. Directly connect can refer to virtual, logical and/or real connections between a base station and a base station controller, for example where the connection does not have to go through another base station controller. In a radio access network of a UMTS system, a base station can refer to a Nodeb, and a base station controller can refer to a radio network controller (RNC). Radio access network comprises at least the Nodebs and the RNCs. FIG. 3 shows a radio access network architecture 80 where each Nodeb 82a (Nodeb1), 82b (Nodeb2) and 82c (Nodeb3) can directly communicate with radio network controllers 84a (RNC1), 84b (RNC2) and 84c (RNC3) using a connection network 86. Depending on the embodiment, the connection network 86 can be implemented in different ways. In this embodiment, the connection network is an internet protocol (IP) based network.

By enabling direct communications or connections between the Nodebs 82a-c and the RNCs 84a-c, a more flexible radio access network is provided which can provide improved or desired performance or operation. The radio access system can assign and connect a base station controller based on information on the base station controller(s), on the base station(s) and on the wireless unit(s) attempting to access the radio network (including any operating or control parameter(s), identifier(s) and/or measurements), such as a traffic load or resource availability parameter(s) for a base station controller. For example, RNCs 84a-c can provide information over the connection network 86 to the Nodebs which can retrieve the information and use the information to determine which RNC with which to connect. Depending on the embodiment, the connection network 86 could use a multicast address(es) to which the connection network nodes (Nodebs 82a-c and the RNCs 84a-c) subscribe such that the nodes can listen to any node that multicasts data to the multicast address.

As such, in this illustrative embodiment, the RNCs 84a-c can publish periodically or event-triggered (for example when usage exceeds a threshold level) the information characterizing the respective RNCs, such as resource availability information for each RNC 84a-c, via multicast messages that are provided to the connection network 86. Nodebs 82a-c will listen to such messages and update an RNC listed maintained at each Nodeb 82a-c. Additionally, it is possible to use policies to restrict Nodebs 82a-c usage of certain RNCs 84a-c even though Nodebs 82a-c may still be able to listen to messages from such RNCs. For example, Nodeb1 can listen to messages from RNC1, RNC2 and RNC3 but may be asked via policy configuration or assignment function to route data sessions to only RNC1 and RNC2. Alternatively, different groups of RNCs could be assigned different multicast addresses, and the Nodebs could listen to one or more of those multicast addresses.

Using the maintained RNC list which can reflect the priority of the RNCs for each particular Nodeb, the Nodeb can decide how to route the call set up requests for the wireless unit 88 using schemes or RNC assignment system (which can include determination, assignment, scheduling, selection, connection and/or allocation of the RNCs). Alternatively, the RNCs 84*a-c* or groups thereof can be treated as a pool of RNCs, and the Nodebs can request an RNC to use in setting up a call from an RNC assignment function which is part of or coupled to the connection network 86. The RNC assignment function could maintain information to use in determining which RNC to assign to a Nodeb request using the schemes described below. The RNC assignment function could assign RNCs on a per call basis, or the RNC assignment function could assign a Nodeb to a particular RNC under normal conditions but direct the particular Nodeb to a different Nodeb if the normal RNC is failing or heavily loaded.

Once the RNC is assigned according to the RNC assignment scheme, the bearer plane transmissions used to set up a data connection and send the bearer traffic or user-generated traffic can be accomplished. The reconfigurable radio access system provides an open radio access network architecture where data packets are to be delivered to various links. For example, a wireless unit in soft handoff will receive data packets from a plurality of base stations on the downlink. As such, the RNC can send multiple copies to the nodes or use some type of multicast feature. Instead of using the IP multicast (defined by the Internet Engineering Task Force (IETF)) described above for use by an exemplary RNC assignment system to obtain information used in selecting an RNC, an application layer multicast scheme can be used. An application layer multicast scheme allows more efficient implementation of the reconfigureable connections network on the downlink. For example, an x-cast scheme can be used which is an IETF proposal to multicast at the application level. The x-cast approach alleviates the multicast address allocation problem that occurs if IP multicast is done for the bearer plane.

Figure 4:
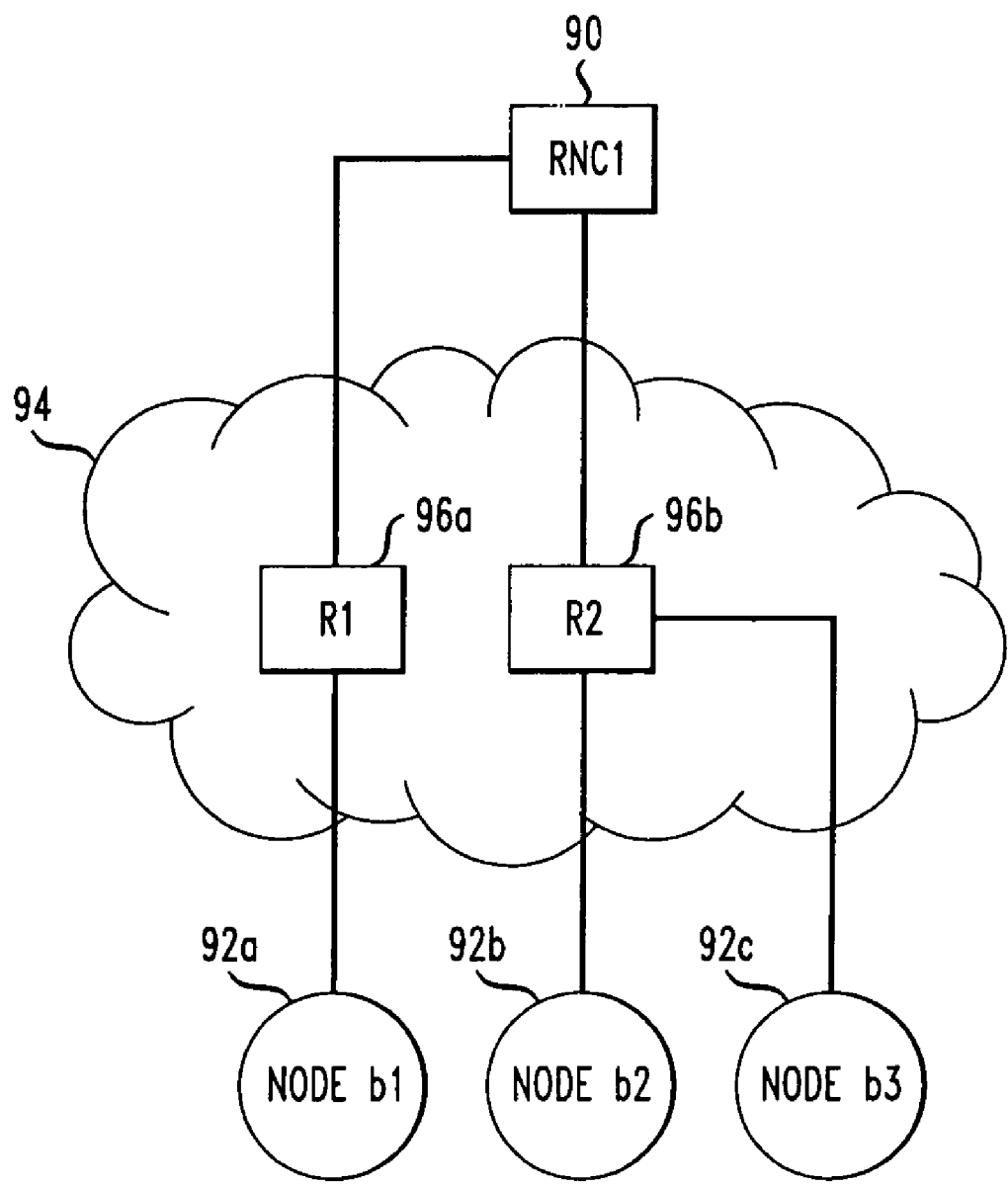
FIG. 4 shows an embodiment of a portion of a reconfigurable radio access system according to principles of the present invention.

In certain embodiments, the serving RNC can multicast traffic to all Nodebs on the downlink. For example, FIG. 4 shows an example of how the connections between a serving or selected RNC1 90 can be established with Nodebs 92*a* (Nodeb1), 92*b* (Nodeb2) and 92*c* (Nodeb3) through the connections network 94. In this embodiment, the connections network 94 is IP-based, and routers 96*a* (R1) and 96*b* (R2) can be used to establish the direct logical or virtual connections between the RNC1 90 and the Nodebs 92*a-c*. For example, on the downlink, the IPv4 version of the x-cast approach can be used where R1 and R2 are made aware of the x-cast protocol. The RNC1 90 can receive the downlink packet and encapsulate the packet as follows:

| Source IP | RNC1 | |
|---|---|---|
| Dest IP | multicast | (only one address is used) |
| Protocol ID = xcast | | |
| # of destinations 3 | | |
| Destination IP1 | Nodeb1 | |
| Destination IP2 | Nodeb2 | |
| Destination IP3 | Nodeb3. | |

The router 96*a* (R1) will send the following to Nodeb1:

| Source IP | RNC1 |
|---|---|
| Dest IP | Nodeb1 or |
| Source IP | R1 |

-continued

| Destination | Nodeb1 |
|---|---|
| Protocol ID = xcast | |
| Source IP | RNC1 |
| Dest IP | multicast. |

On the uplink, normal IP can be used since no multicast feature is required.

The reconfigurable wireless communications access system can provide higher reliability by permitting Nodebs to switch between different RNCs. For example, higher reliability can be achieved by having an assignment or selection scheme where Nodeb1 connects to RNC1 under normal circumstances. If RNC1 fails, the radio access system, for example using an RNC assignment scheme in the RNC1, in the Nodeb2 and/or in the connection network 86 or coupled thereto, directs all Nodeb2 connections to RNC2 and/or RNC3. Similarly, Nodeb2 can be provisioned to connect to RNC2, and if RNC2 fails, Nodeb2 can talk to RNC3 and/or RNC1. Nodeb3 can be set up to connect with RNC3 under normal conditions, and if RNC3 fails, the connections of Nodeb2 can be forwarded to RNC1 and/or RNC2. Alternative embodiments or arrangements are possible. For example, there could be N+K RNCs where N are working RNCs and K are spare RNCs which can be used by many Nodebs. Alternatively, the RNC assignment system would simply not assign any Nodeb to a RNC that was failing or heavily loaded and a different RNC would be assigned according to the RNC assignment system.

Figure 5:
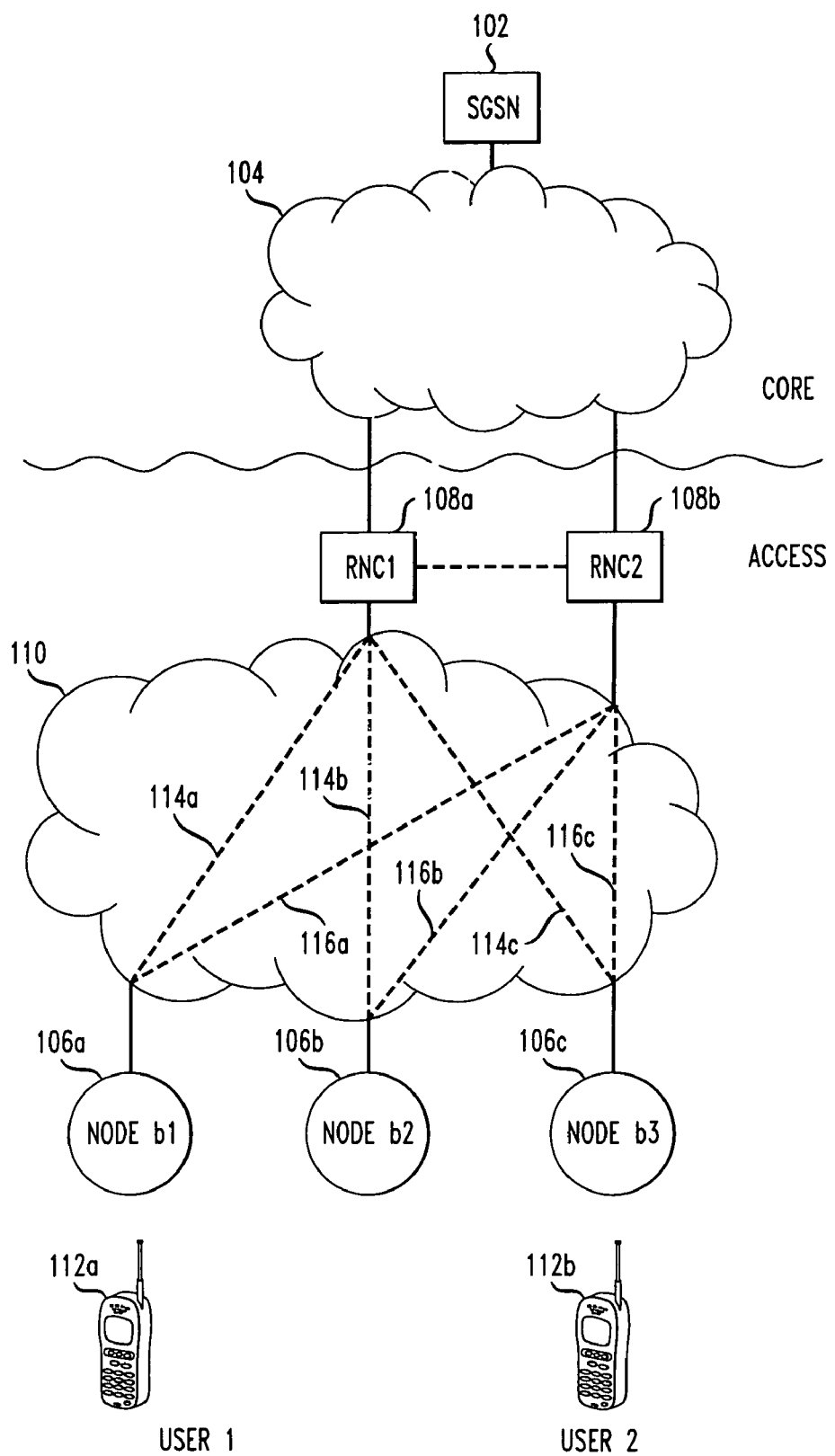
FIG. 5 shows an embodiment of a reconfigurable radio access system according to principles of the present invention.

The reconfigureable radio access system can be configured to reduce the differential delays between signals received by base stations which are in soft handoff with a wireless unit. For example, FIG. 5 shows a diagram of at least a portion 100 of a radio access system connected to an SGSN 102 of the core network through a ATM-IP network 104. In this embodiment, each Nodeb 106*a* (Nodeb1), 106*b* (Nodeb2) and 106*c* (Nodeb3) can connect to a list of RNCs, including RNC 108*a* (RNC1) and RNC 108*b* (RNC2), through the connection network 110. Accordingly, Nodeb1, Nodeb2 and Nodeb3 all can talk to RNC1 and RNC2. If wireless unit 112*a* (user1) starts a session with Nodeb1, the radio access system (for example using the RNC assignment function in the Nodeb, the RNC, the connection network and/or coupled to the radio access system) can determine to use RNC1 (RNC 108*a*) as the serving RNC, and a connection or leg 114*a* is established between the Nodeb1 and the RNC1. As the wireless unit 112*a* moves into soft handoff with Nodeb2 (Nodeb 106*b*), a signaling message can be sent from RNC1 to Nodeb2, and a new leg 114*b* is added between Nodeb2 and RNC1. Similarly, when the wireless unit 112*a* moves into soft handoff with Nodeb3 (Nodeb 106*c*), RNC1 can send a signaling message to Nodeb3, and a leg 114*c* is added between RNC1 and Nodeb3. Because all the base stations Nodeb1, Nodeb2 and Nodeb3 in soft handoff with the wireless unit 112*a* are connected to one base station controller RNC1, the differential delay problem is reduced by not needing a DRNC.

The reconfigurable radio access system can be configured such that different wireless units being serviced by the same Nodebs can use different RNC. For example, the wireless unit 112*b* can be in soft handoff with Nodeb1, Nodeb2 and Nodeb3 at the same time as the wireless unit 112*a*. However, instead of being connected to the RNC1, the Nodeb1, Nodeb2 and Nodeb3 have legs 116a-c, respectively to RNC2 in providing soft handoff communications to the wireless unit 112b.

With the reconfigurable radio access system, different load-balancing schemes can be used to distribute the load among the different RNCs and Nodebs. Such load balancing schemes can be based on prices charged for different services. One load balancing scheme could be based on QoS. In an embodiment of such a scheme, the RNCs could broadcast information to all Nodebs informing the Nodebs which RNCs do not want to accept any more connections. Nodeb (via provisioning) is provided with a list of RNCs with which it can communicate. Nodebs choose an RNC from the list to start with each connection request.

For example, if there are 360 Nodebs and 4 RNCs, each Nodeb can be given the 4 RNC addresses. Each Nodeb (or RNC allocation function) will keep a count of the bandwidth requested by each QoS class to each RNC. Nodeb will use this information to compute a weight for each RNC and prioritize the RNCs according to this weight. The Nodeb can then assign the next connection to the RNC with the least weight. Assuming each connection with an RNC takes up a certain resource (like processing of signaling messages) with a cost c1 and each connection with a bandwidth BWi (i=1 to 4 for 4 UMTS QoS classes) cost $c2i$, the total cost for using RNCj is $xji*c2+\Sigma yji*c2i$. The following table gives example numbers for the bandwidths BW for the different QoS classes.

|  | # of connections | BW1 kbps | BW2 kbps | BW3 kbps | BW4 kbps | Total kbps | Cost1 | Cost 2 |
|---|---|---|---|---|---|---|---|---|
| RNC1 | 6 | 18 | 24 | 36 | 94 | 172 | 992 | 184 |
| RNC2 | 3 | 20 | 34 | 40 | 100 | 194 | 1063 | 200 |
| RNC3 | 5 | 30 | 30 | 50 | 90 | 230 | 1035 | 240 |

If c1=5 and c21=1, c22=2, c23=4 and c24=8, then the total cost for RNCj is shown in column Cost1. Where c1=2 and c21=c22=c23=c24=4 (when all the $c2i$ are the same because assuming the cost for the different QoS classes is the same), then the total cost is shown in column Cost 2. The Nodeb chooses the RNC with the least cost to communicate with in requesting a connection for communications with a wireless unit. In these two examples, the Nodeb would choose RNC1. Note, the bandwidth values shown can either be measured bandwidth or allocated bandwidth. Also, a soft handoff connection is considered as another connection when doing bin counting on resources that will be consumed. Additionally, the connections can be further divided into voice, data and/or video connections since the signaling cost for the different types of connections may be different. Processing or CPU usage can also be included as one of the resource costs.

The load balancing scheme can be policy-based. For example, the RNC assignment system can have certain Nodebs connect to RNC1, RNC2 and RNC3 while the rest of the Nodebs connect with RNC4 and RNC5. Furthermore, the RNC assignment scheme can use a hybrid load balancing scheme where load balancing based on resource allocation or use is used with a policy based scheme, or load balancing scheme based on resource allocation or use is used with various policy restrictions or configuration imposed thereon. Other load-balancing schemes can be used with take into consideration additional factors and/or use different variations of the above or different schemes in assigning or allocating RNCs. Alternatively, RNC can be assigned based on the type of customer and/or on the particular customer attempting to access the RAN with a wireless unit. Accordingly, the RNC can be assigned on a per wireless unit basis to connect with the base station(s) connected to the wireless unit. The RNC assignment system can do so using information characterizing (including identifying) the wireless unit.

The reconfigurable access system has been described for use in a UMTS system, but the reconfigurable access system according to the principles of the present invention can be used with different cellular systems or wireless local area network (LAN) configurations which omit and/or add components and/or use variations or portions of the described system. For example, the reconfigurable access system can be implemented in a wireless LAN environment. Typically, in a wireless LAN architecture, access points (APs) can be treated as base stations which communicate with wireless units over the air. Each AP connects to only one of a plurality of mobility agents which provides access to a packet data network. The mobility agent can be a foreign agent which has similar functionality to the SGSN for the UMTS system or a home agent which, when in a home network, functions analogous to the GGSN in the UMTS system.

Figure 6:
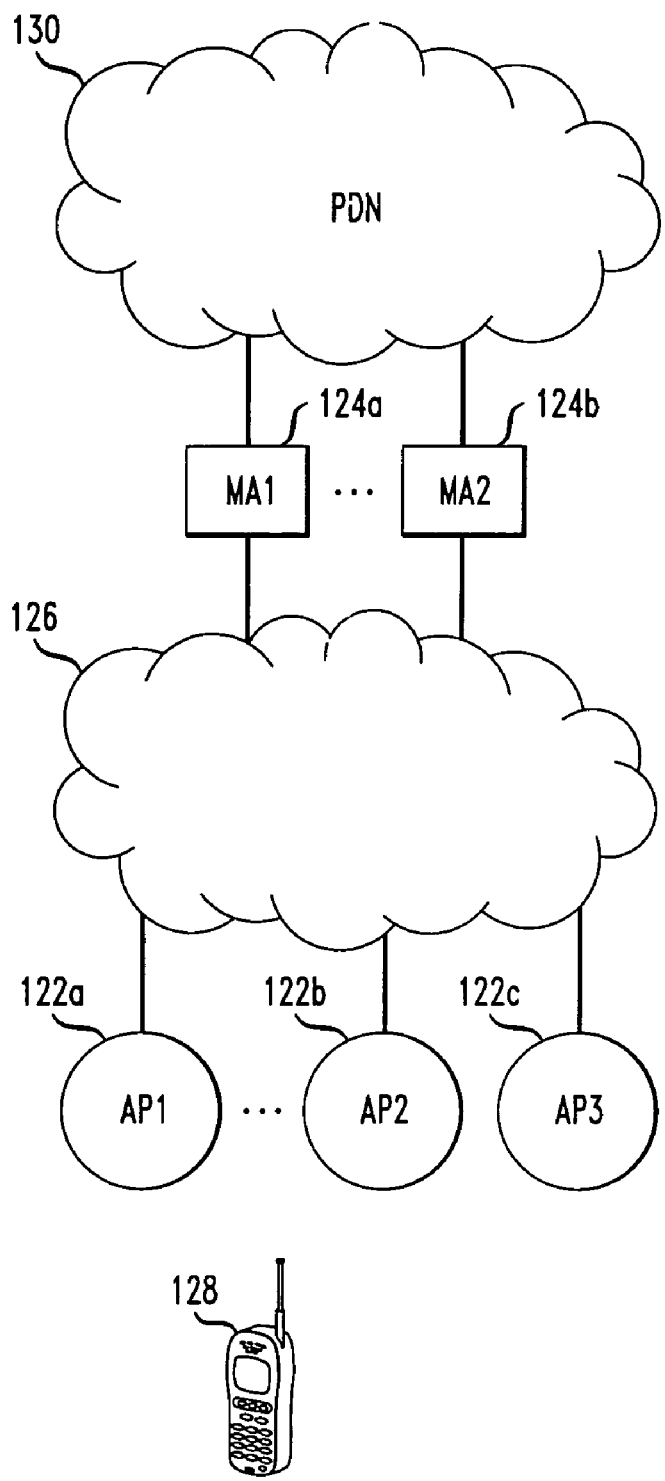
FIG. 6 shows an alternative embodiment of a reconfigurable radio access system according to principles of the present invention in a wireless LAN architecture.

In accordance with an alternative embodiment of the present invention, FIG. 6 shows a reconfigurable access system in a wireless LAN 120. The reconfigurable access system includes access points (APs) 122a (AP1), 122b (AP2) and 122c (AP3), and rather than connecting to a particular mobility agent (MA), the APs 122a-c can connect to MAs 124a (MA1) and 124b (MA2) through a connection access network 126, such as an IP network. Depending on the embodiment or the application, the boundaries of the reconfigurable access system can change. For example the wireless access system can include a plurality of base stations which communicate with wireless units over the air and a plurality of base station controllers which connect to base station equipment to control traffic flowing to and from the plurality of base stations. The reconfigurable connections occurring between the plurality of base stations and the plurality of base station controllers are being referred to herein as a connection network which is configured based on an assignment system. In general, the reconfigurable access system is used for a wireless communications system including a first set of nodes where each node can establish wireless links with wireless units in geographic proximity to the node. Given a node or nodes (for example, AP, base station or RNC) in the first set, a node (for example, a mobility agent, base station controller or RNC) in a second set of nodes is used to connect with the node or nodes in the first set where a communications link of an end to end communications path (from a wireless unit to a PSTN, a PDN and/or another wireless unit) includes one node of the first set and one node of the second set. Given the node in the first set, the reconfigurable access system can determine and/or assign a node of the second set to connect with the given one of the first set based on an assignment system, for example based on the usage of nodes in the second set.

In an embodiment of the wireless LAN, the MAs 124a-b broadcast messages to the APs 122a-c containing information of the current status and/or resource usage of the MAs 124a-b. When an Access Point (AP) 122a-c receives a signaling message from a wireless unit 128 attempting to set up a data session with a packet data network 130, the AP 122a-c can forward the request to the appropriate MA 124a-b depending on the MA assignment system, for example the MA with the least cost analogous to the cost described for the UMTS system above. Depending on the embodiment, the information passed between the wireless unit, the base station and/or the base station controller can include rate and/or QoS information for the wireless unit or other information the base station, base station controller or other controller coupled to the radio access system can use to determine which base station controller to assign the base station.

It should be understood that the system and portions thereof and of the described architecture can be implemented in processing circuitry at different location(s), such as the wireless unit, the base station, a base station controller, SGSN, GGSN and/or mobile switching center. Moreover, the reconfigurable radio access system can be implemented in application specific integrated circuits, software-driven processing circuitry, firmware, programmable logic devices, hardware, discrete components or arrangements or portions of the above components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. A method of providing access to a wireless communications system in which a plurality of nodes in a first set establish wireless links with wireless units located in geographic proximity to said nodes, said method comprising the steps of:
   receiving information characterizing usage level of nodes of a second set, said set node of said second set responsible for frame selection, encryption and handling of access network mobility;
   using said information by a node of said first set to determine a first node of said second set with which to connect; and connecting said node of said first set with said first node of said second set;
   receiving information by said node of said first set from said nodes of said second set using a multicast address associated with said nodes of said second set;
   maintaining a list by said node of said first set of nodes of said second set based on said information; and
   using said list by said node of said first set to determine said first node of said second set with which to connect.

2. The method of claim 1 wherein said using step uses said information characterizing usage levels of the nodes of the second set and information characterizing said node of said first set to determine a node of said second set with which to connect.

3. The method of claim 1 wherein said using step uses said information characterizing usage level of the node of the second set and information characterizing a wireless unit for which a connection is being established.

4. The method of claim 1 wherein said step of connecting further comprising connecting said node of said first set with a second node of said second set.

5. The method of claim 1 wherein said step of connecting further comprising:
   connecting said node of said first set with said first node of said second set for establishing a connection with a first wireless unit; and
   connecting said node of said first set with a second node of said second set for establishing a connection with a second wireless unit.

6. The method of claim 1 wherein establishing the wireless links between the nodes of the first set with the wireless units located in geographic proximity to said nodes is through a connection network.

7. The method of claim 6 wherein said connection network is an internet protocol (IP) based network.

8. A radio access system in a wireless communications system comprising:
   a plurality of nodes in a first set adapted to establish wireless links with wireless units located in geographic proximity to said nodes;
   a connection network coupled to said plurality of nodes of said first set;
   a plurality of nodes of a second set coupled to said connection network adapted to provide connections between a node of said plurality of nodes of said first set and said plurality of nodes of said second set, said plurality of nodes of said second set responsible for frame selection, encryption and handling of access network mobility; and
   processing circuitry adapted to receive information characterizing usage levels of the nodes of the second set and to use said information to determine a node of said second set to connect with said node of said first set;
   wherein said processing circuitry being at said node of said first set and being adapted to receive information characterizing usage levels of said nodes of said second set and to use said information by said processing circuitry to determine said node of said second set with which to connect said node of said first set;
   wherein said processing circuitry further adapted to receive information from nodes of said second set using a multicast address associated with said nodes of said second set, to maintain a list of nodes of said second set based on said information, and to use said list to determine said node of said second set with which to connect said node of said first set.

9. The system of claim 8 wherein said processing circuitry adapted to use information including usage level of the nodes of the second set and to use information including nodes of said second set to determine said node of said second set with which to connect.

10. The system of claim 8 wherein said processing circuitry is adapted to use said information characterizing usage levels of the nodes of the second set and information characterizing said node of said first set to determine said node of said second set.

11. The system of claim 8 wherein said processing circuitry is adapted to use said information characterizing usage levels of the nodes of the second set and information characterizing a wireless unit for which a connection is being established to determine said node of said second set.

12. The system of claim 8 wherein said radio access system adapted to connect a node of said first set with a first node of said second set and to connect said node of said first set with a second node of said second set.

13. The system of claim 8 wherein said radio access system further adapted to connect a node of said first set with a first node of said second set of base station controllers for establishing a connection with a first wireless unit and to connect said node of said first set with a second node of said second set for establishing a connection with a second wireless unit.

14. The system of claim 8 wherein said connection network is an internet protocol (IP) based network.

* * * * *